(12) United States Patent
Fan et al.

(10) Patent No.: US 10,968,735 B2
(45) Date of Patent: Apr. 6, 2021

(54) DEVIATED PRODUCTION WELL TELEMETRY WITH ASSISTING WELL/DRILLSHIP

(71) Applicant: Halliburton Energy Services, Inc., Houston, TX (US)

(72) Inventors: Yijing Fan, Singapore (SG); Li Pan, Singapore (SG); Hsu-Hsiang Wu, Sugarland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/757,952

(22) PCT Filed: Dec. 28, 2016

(86) PCT No.: PCT/US2016/068981
§ 371 (c)(1),
(2) Date: Mar. 6, 2018

(87) PCT Pub. No.: WO2018/125099
PCT Pub. Date: Jul. 5, 2018

(65) Prior Publication Data
US 2019/0032483 A1 Jan. 31, 2019

(51) Int. Cl.
*E21B 47/13* (2012.01)
*H04B 5/02* (2006.01)
(Continued)

(52) U.S. Cl.
CPC .............. *E21B 47/13* (2020.05); *E21B 41/00* (2013.01); *E21B 47/12* (2013.01); *E21B 47/125* (2020.05);
(Continued)

(58) Field of Classification Search
CPC ........ E21B 47/122; E21B 41/00; E21B 47/12; E21B 47/121; E21B 47/123; G01V 11/002; G01V 3/30; H04B 5/02; H04B 1/38
See application file for complete search history.

(56) References Cited

U.S. PATENT DOCUMENTS 4,792,802 A 12/1988 Meadows
5,091,731 A 2/1992 Rees
(Continued)

FOREIGN PATENT DOCUMENTS

WO 9806924 2/1998

OTHER PUBLICATIONS

International Search Report and Written Opinion for Application No. PCT/US2016/068981 dated Sep. 11, 2017.
(Continued)

*Primary Examiner* — Yong-Suk (Philip) Ro
(74) *Attorney, Agent, or Firm* — Benjamin Ford; C. Tumey Law Group PLLC

(57) ABSTRACT

A telemetry and communication system and method for communication between a well production system and a well assist system. The system may comprise a well production system, which may comprise a telemetry sensor disposed in a production well below a highly conductive layer and a transmitter. The system may further comprise a well assist system comprising a sensor which is operable to receive information from the transmitter. A method for providing telemetry and communication may comprise determining a location of a well assist system for a well production system, deploying the well assist system to the location, disposing a sensor from the well assist system below a highly conductive layer, and receiving information with the sensor, the information being transmitted from a
(Continued)

transmitter of the well production system disposed below the highly conductive layer.

22 Claims, 7 Drawing Sheets

(51) Int. Cl.
*E21B 47/12* (2012.01)
*E21B 47/125* (2012.01)
*E21B 41/00* (2006.01)
*G01V 11/00* (2006.01)
*E21B 47/135* (2012.01)

(52) U.S. Cl.
CPC ............ *G01V 11/002* (2013.01); *H04B 5/02* (2013.01); *E21B 47/135* (2020.05)

(56) References Cited

U.S. PATENT DOCUMENTS

| | | | |
|---|---|---|---|
| 5,706,892 A | 1/1998 | Aeschbacher et al. | |
| 5,706,896 A | 1/1998 | Tubel et al. | |
| 6,439,324 B1 | 8/2002 | Ringgenberg et al. | |
| 6,970,099 B2 | 11/2005 | Koro et al. | |
| 7,080,699 B2 | 7/2006 | Lovell et al. | |
| 7,301,473 B2* | 11/2007 | Shah | E21B 47/16 340/854.4 |
| 7,347,271 B2 | 3/2008 | Ohmer et al. | |
| 8,400,326 B2 | 3/2013 | Codazzi | |
| 9,625,603 B2* | 4/2017 | Stolpman | G01V 3/34 |
| 9,903,195 B2* | 2/2018 | Wu | E21B 33/13 |
| 10,317,563 B2* | 6/2019 | Donderici | G01V 3/18 |
| 2004/0129456 A1* | 7/2004 | Vail, III | E21B 17/206 175/57 |
| 2005/0183887 A1 | 8/2005 | Rodney et al. | |
| 2009/0090499 A1 | 4/2009 | Lewis et al. | |
| 2010/0277177 A1 | 11/2010 | Alumbaugh et al. | |
| 2014/0192618 A1* | 7/2014 | Pabon | G10K 11/178 367/34 |
| 2016/0061027 A1 | 3/2016 | Gao et al. | |
| 2017/0226849 A1 | 8/2017 | Fan | |
| 2017/0261634 A1 | 9/2017 | Pan | |
| 2017/0322336 A1 | 11/2017 | Pan | |
| 2019/0162064 A1* | 5/2019 | Donderici | E21B 47/13 |

OTHER PUBLICATIONS

Mercury EMT Telemetry System. Copyright 2018.
Brochure of Telescope telemetry while drilling service. Copyright 2007.

\* cited by examiner

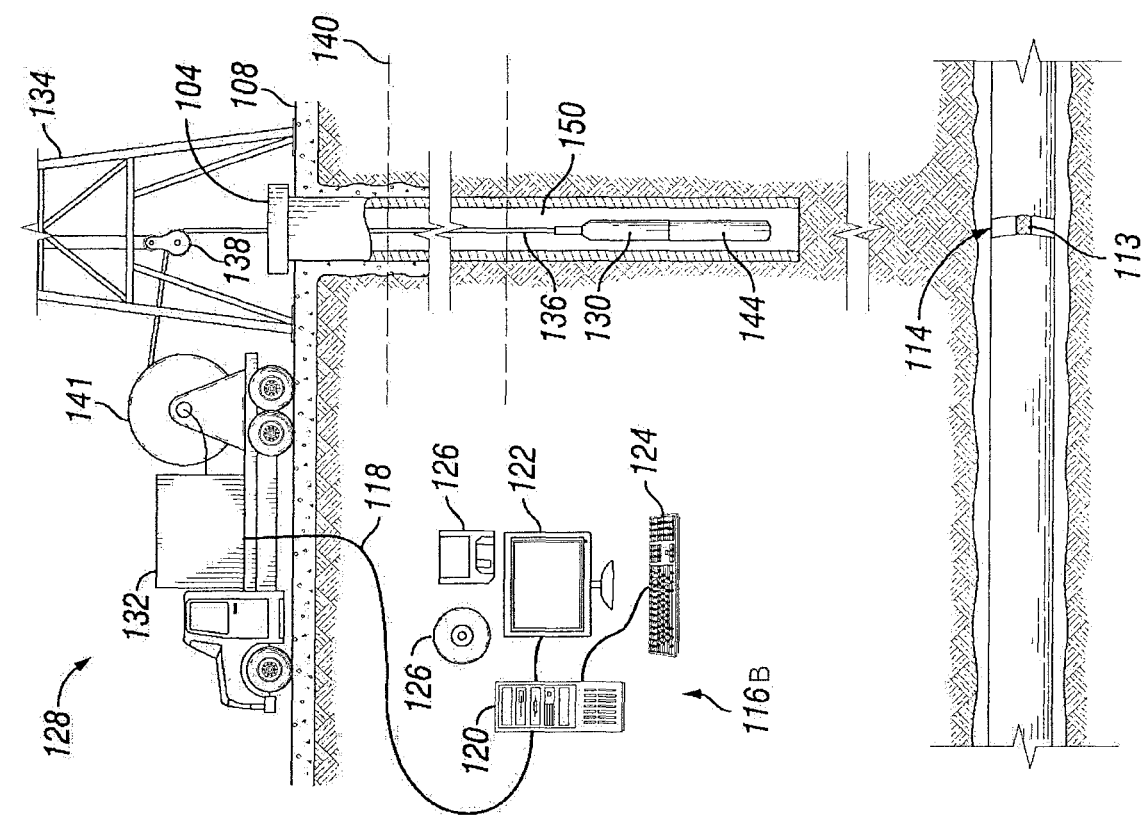
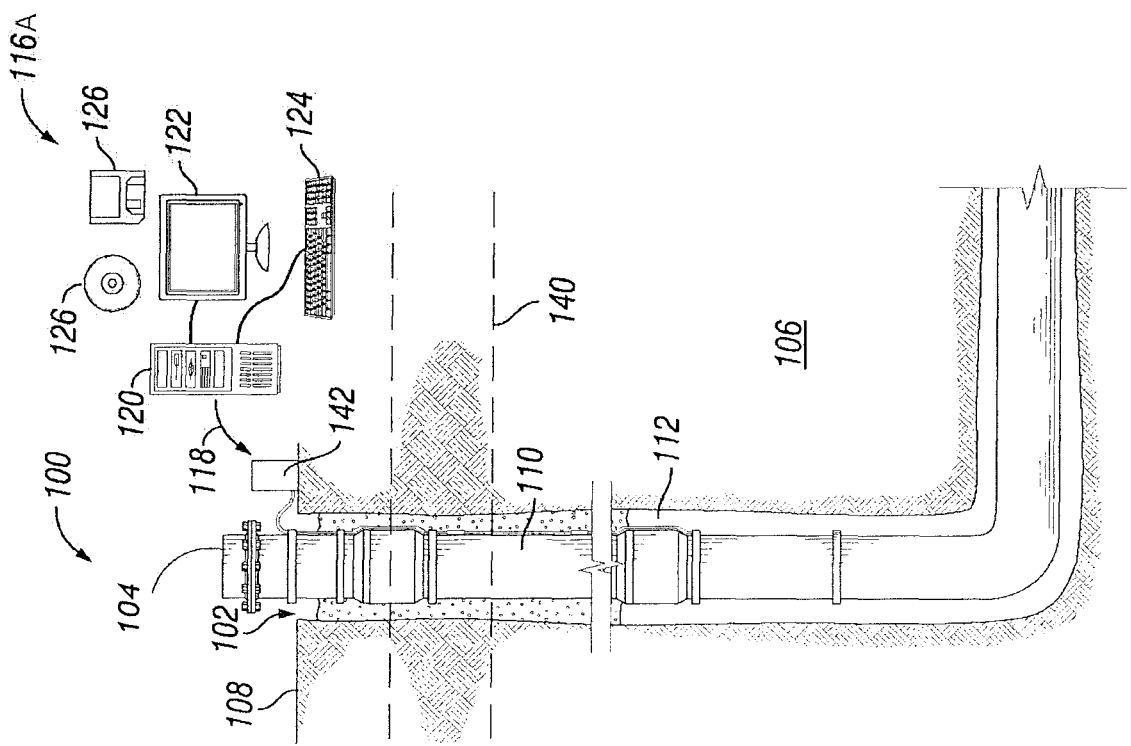
FIG. 1

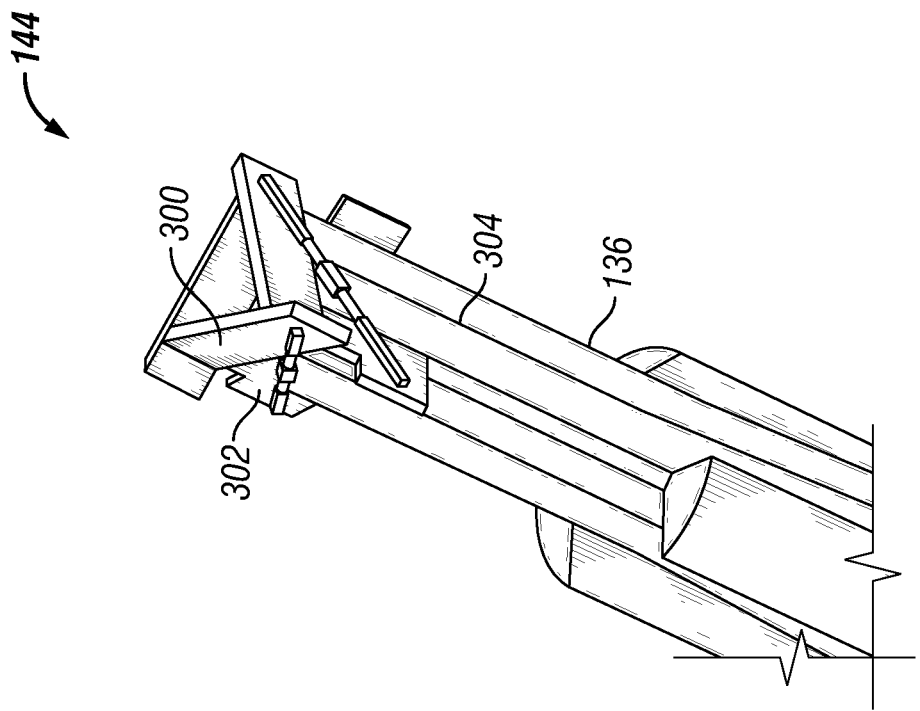
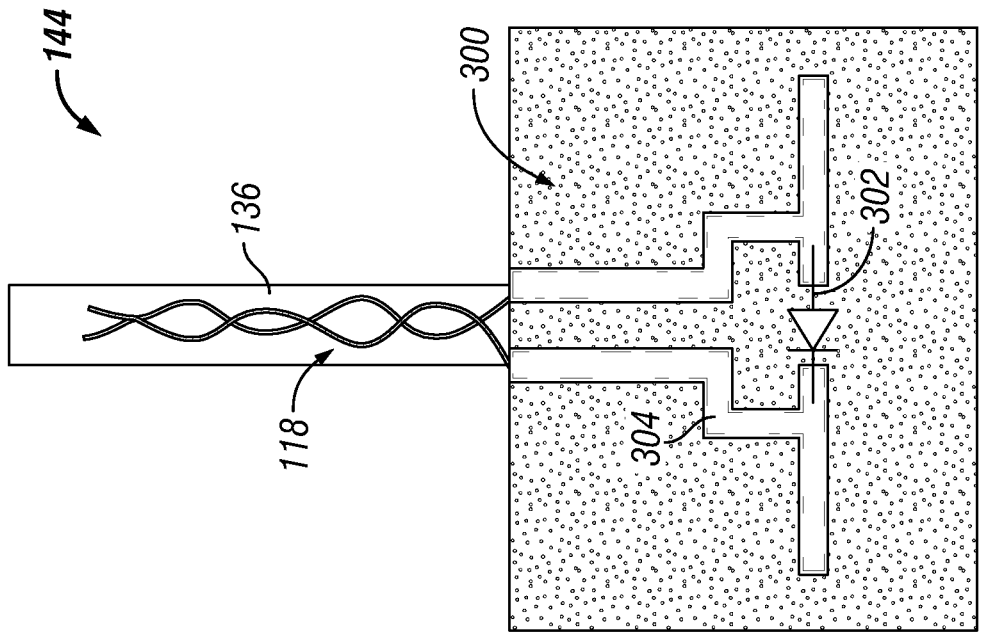

DEVIATED PRODUCTION WELL TELEMETRY WITH ASSISTING WELL/DRILLSHIP

BACKGROUND

Wellbores drilled into subterranean formations may enable recovery of desirable fluids (e.g., hydrocarbons) using a number of different techniques. During operation, any number of different bottom hole assemblies may be utilized to recover desirable fluids. Without limitation, logging while drilling (LWD) tools, measurement while drilling (MWD) tools, electromagnetic induction tools, and/or telemetry tools may be implemented during downhole operations. During production, telemetry sensors in the production well may communicate wirelessly with a well production system. However, conductive layers within a formation may prevent electromagnetic fields, emitted by telemetry sensors within the production well for communication with the well production system. This may prevent an operator from obtaining information regarding wellbore parameters and down hole reservoir information such as fluid flow rate, temperature, pressure, resistivity, and/or the like.

In deviated wells that may stretch for miles, it may be too expensive to run communication cables from sensors in the deviated well to the well production system. Cables may inhibit flow of fluids through wellbores and may be prone to breaking. Damaged and/or broken cables may be expensive to recover and re-run.

BRIEF DESCRIPTION OF THE DRAWINGS

These drawings illustrate certain aspects of some examples of the present disclosure, and should not be used to limit or define the disclosure.

FIG. 1 is a schematic illustration of an example of well production system and a well assist system;

FIG. 3*a* is a schematic illustration of a sensor;

FIG. 3*b* is another schematic illustration of a sensor;

DETAILED DESCRIPTION

Figure 2:
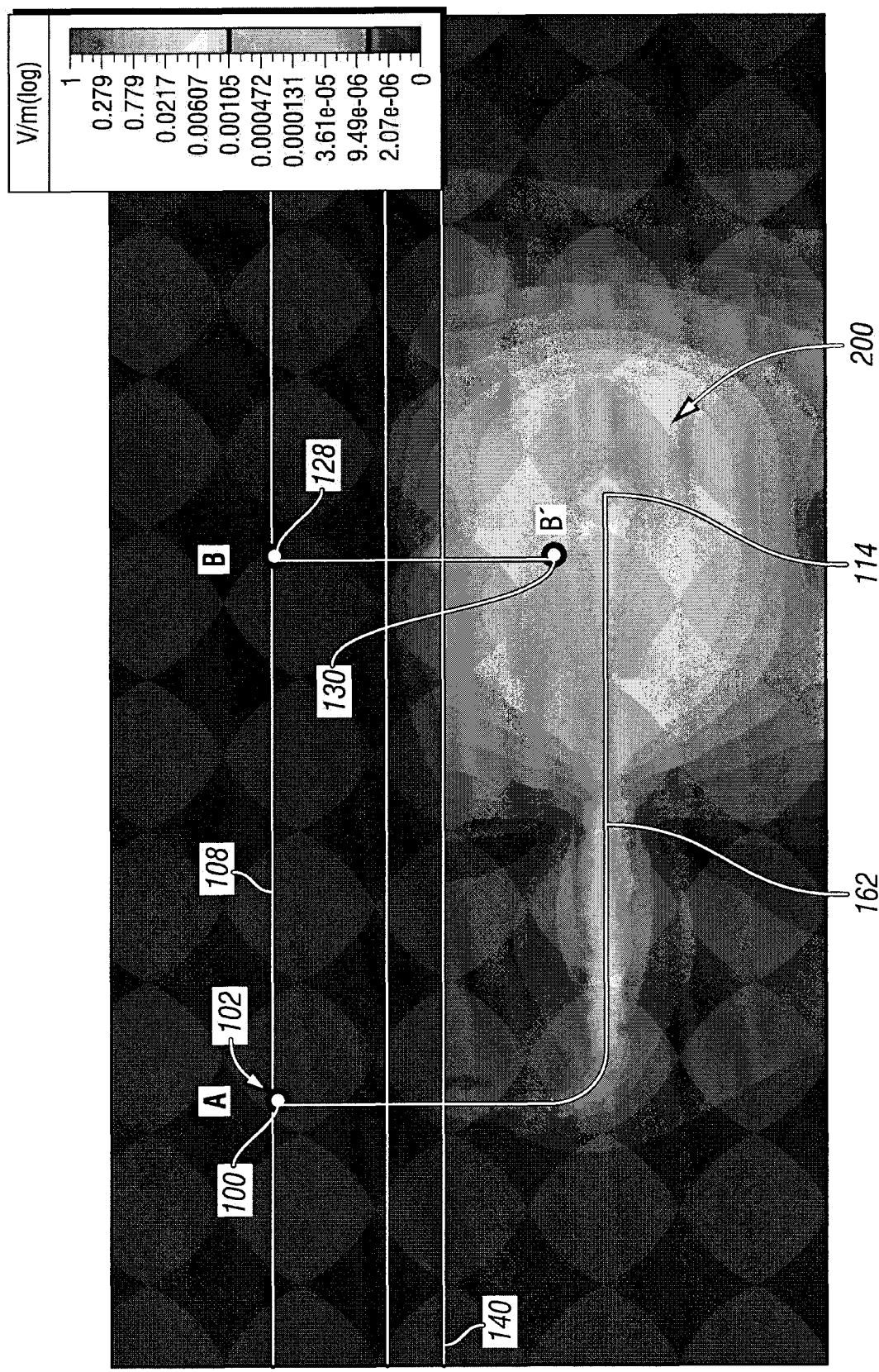
FIG. 2 is a schematic illustration of the strength of an electromagnetic field in relation to a well production system, a well assist system, and a conductive layer.

Certain aspects and features of the disclosure may be directed to well production operations and, more particularly, to a well assist system and/or an assist ship for improving the telemetry range and signal to noise level in well production. Additionally, a method for planning and drilling a new assisting well for improving telemetry in deviated well production is disclosed. Generally, wireless electromagnetic telemetry and/or communication without an assisting well and/or an assist ship may be difficult. An assist well and/or assist ship may help to reduce signal leakage into the formation and enhance signal to noise level received at a well production system. Well assist system and/or an assist ship may overcome conductive layers that may exist between deviated well trajectory and the drilling system. Conductive layers may prevent the propagation of electromagnetic field from a telemetry sensor for telemetry and/or communication between the telemetry sensor and a well production system.

Systems and methods of the present disclosure may be implemented, at least in part, with an information handling system. An information handling system may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a well production system 100. As illustrated, wellbore 102 may extend from a wellhead 104 into a formation 106 from a surface 108. Generally, wellbore 102 may include horizontal, vertical, deviated, slanted, curved, and other types of wellbore geometries and orientations. Wellbore 102 may comprise a casing 110 and/or may be uncased. In examples, casing 110 may comprise a metallic material that may be conductive and magnetic. By way of example, conductive and magnetic member may be a casing, liner, tubing, or other elongated steel tubular disposed in wellbore 102. Casing 110 may be encased by cement 112, which may be disposed between casing 110 and formation 106.

As illustrated, wellbore 102 may extend through formation 106. As illustrated in FIG. 1, wellbore 102 may be deviated in that it may extend at an angle through formation 106, such as horizontal, deviated, and/or slanted wellbores. Although FIG. 1 illustrates a high inclination angle or horizontal placement of the wellbore 102, vertical or low inclination angle well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure. In examples, well production system 100 may comprise multiple wellbores 102 for production.

Telemetry sensors 114 may be disposed in wellbore 102. Telemetry sensors 114 may be disposed at any location along wellbore 102, such as a producing zone of wellbore 102. Telemetry sensor 114 may be disposed on, within, attached to, and/or the like to casing 110. A transmitter 113 may be disposed on, within, attached, to, and/or the like to telemetry sensor 114. Transmitter 113 may be any suitable gap electrode. Transmitter 113 may operate to transmit electromagnetic waves, radio waves, and/or the like through formation 106. Current is generated and transmitted into the formation. Telemetry sensors 114 may monitor fluid flow rate, temperature, pressure, resistivity, and/or the like and communicate the recorded information through transmitter 113. In examples, a downhole information handling system (not illustrated) which may be disposed on telemetry sensor 114 may include, but is not limited to, a microprocessor or other suitable circuitry, for estimating, receiving and processing signals from telemetry sensors 114. Downhole information handling system (not illustrated) may further include additional components, such as memory, input/output devices, interfaces, and the like. In examples, while not illustrated, telemetry sensors 114 may include one or more additional components, such as analog-to-digital converter, filter and amplifier, among others, that may be used to process the measurements of telemetry sensors 114 before they may be transmitted. Alternatively, raw measurements from telemetry sensors 114 may be transmitted.

As illustrated, communication link 118 (which may be wired or wireless, for example) may transmit data between first information handling system 116a and/or second information handling system 116b and downhole tool 130 (discussed below). First information handling system 116a and/or second information handling system 116b may include a processing unit 120, a monitor 122, an input device 124 (e.g., keyboard, mouse, etc.), and/or computer media 126 (e.g., optical disks, magnetic disks) that can store code representative of the methods described herein. In addition to, or in place of processing at surface 108, processing may occur downhole.

Producing well 102 may be drilled below the conductive layer 140, as shown in FIG. 1. As discussed above, transmitter 113 may be disposed within wellbore 102 and may emit an electromagnetic field (not illustrated) with encoded sensor information from telemetry sensors 114. One or more telemetry sensors 114 may measure and/or record information that may determine wellbore parameters, production parameters, and downhole reservoir information such as fluid flow rate, temperature, pressure, resistivity, and/or the like. Based on the information obtained, downhole tools, not illustrated, disposed within wellbore 102 may be modified and/or altered to account for changes in operating circumstances such as formation flows, water intrusion, and/or the like. Communication between telemetry sensors 114 and well production system 100 may be important for production monitoring and control. Generally, hard wired communications have been used to connect telemetry sensors 114 and well production system 100. For example, a cable, not illustrated, may run the length of wellbore 102 and/or wellbore 102. The cable inside wellbore 102 may limit the flow diameter and affect the production within wellbore 102. In addition, long cables may be expensive and complex to install. Furthermore, they may be prone to fail, which may provide limited possibilities for correction. Should the cable fail, there may be a significant risk that the only way to correct the problem may be to recomplete the well, which may be comprise significant risk and cost. Thus, telemetry sensors 114 with transmitter 113 may provide greater benefits than communication by cable.

Transmitter 113 may wirelessly communicate by transmission of electromagnetic fields. In land rigs, formations may be very resistive, which may prevent the travel electromagnetic fields for large distances. Additionally, in offshore drilling operations, electromagnetic fields may pass through thousands of feet of low resistivity formations and through hundreds to thousands of feet of low resistivity salt water before reaching well production system 100. The large length of travel may cause the electromagnetic field to attenuate to a degree it may not be practical to be received by well production system 100. In examples, wellbore 102 may be employed offshore and/or on land because it may allow well production system 100 to make contact with larger areas within productive formations. However, wellbore 102 may increase the difficultly for wireless communication and telemetry control through electromagnetic fields. A well assist system 128 and method may help in wireless communication from telemetry sensors 114 to well production system 100 when a conductive layer 140 may be present in formation 106. In examples, well assist system 128 may be a second well production system on land and/or an assisting drilling ship on water. Well assist system 128 may avoid the need to deploy cables or transceiver electronics inside wellbore 102, which may help to maintain the stable and maximum production flow. Additionally, well assist system 128 may record electromagnetic fields from telemetry sensors 114 before severe attenuation and may further enhance signal level received at surface 108. A new reception point near the well assist system 128 may avoid noise near wellbore 102.

Transmitter 113 may attempt to transmit temperature and pressure data to production receiver 142 at well production system 100. In examples, transmitter 113 may broadcast a low frequency electromagnetic wave, typically in the tens of Hz or less. For example, a shallow and relatively high resistive formation, the current electromagnetic transmission scheme may suffice for conveying this data to well production system 100. However, conductive layer 140 between transmitter 113 and well production system 100 may attenuate the electromagnetic field and make it difficult to be received at production receiver 142. Due to problems with transmitting the information from transmitter 113 to the production receiver 142, well assist system 128 may be used.

FIG. 1 further illustrates a cross-sectional view of a well assist system 128. As illustrated, well assist system 128 may comprise downhole tool 130 attached to a vehicle 132. It should be noted that downhole tool 130, in alternative embodiments, may not be attached to vehicle 132. Downhole tool 130 may be supported by derrick 134 at surface 108. Downhole tool 130 may be tethered to vehicle 132 through conveyance line 136. Conveyance line 136 may be disposed around one or more sheave wheels 138 to vehicle 132. Conveyance line 136 may be a wireline, slickline, coiled tubing, pipe, or the like, which may provide mechanical suspension as well as electrical conductivity. Conveyance line 136 may comprise an inner core of a plurality of electrical conductors covered by an insulating wrap. An inner and outer steel armor sheath may be disposed around the conductors. The electrical conductors may be used for communicating power and telemetry between vehicle 132 (or other equipment) and downhole tool 130. Downhole tool 130 may include sensor 144. Sensor 144 may sense, measure, and/or record information transmitted by transmitter 113. Information from downhole tool 130 may be gathered and/or processed by second information handling system 116b.

In examples, derrick 134 includes a load cell (not shown) which determines the amount of pull on conveyance line 136 at surface 108 of wellbore 102. Second information handling system 116b may control a safety valve (not illustrated) which controls the hydraulic pressure that drives drum 141 on vehicle 132 which may reels up and/or release conveyance line 136 which may move downhole tool 130 up and/or down assist wellbore 150. The safety valve may be adjusted to a pressure such that sheave wheel 138 may only impart a small amount of tension to conveyance line 136 over and above the tension necessary to retrieve conveyance line 136 and/or downhole tool 130 from assist wellbore 150. The safety valve is typically set a few hundred pounds above the amount of desired safe pull on conveyance line 136 such that once that limit is exceeded, further pull on conveyance line 136 may be prevented.

An example of an electromagnetic field transmission from a telemetry sensor 114 will now be described. As illustrated in FIG. 1, contacting conductive layer 140 may be common when drilling under a river and/or drilling offshore under a seabed. In examples, production receiver 142 may be connected between wellhead 104 and a ground stake several tens of meters away. Information transmitted by electromagnetic field from telemetry sensors 114, such as temperature and pressure, may be encoded into the electromagnetic field and may be transmitted to production receiver 142. The electromagnetic field may partially propagating along wellbore 102 and partially propagating through formation 106. The distribution of the electromagnetic field may be dependent on the shape of wellbore 102 and formation 106 composition. For normal stratified formation layer, the peak of the electromagnetic field may shift away from wellhead 104 with increasing section length of wellbore 102. Hence, the signal received near wellhead 104 by production receiver 142 may be small for long horizontal wells. As disclosed herein, well assist system 128 may be used to assist communication from telemetry sensors 114.

FIG. 2 illustrates the strength of electromagnetic field 200 in relation to its source (e.g., transmitter 113 on FIG. 1). Electromagnetic field 200 may attenuate greatly if a conductive layer 140 may be present between the telemetry sensor 114 and surface 108. Conductive layer 140 may block most of electromagnetic field 200 that may be received at surface 108. This may hinder communication between telemetry sensor 114 and well production system 100. To restore communication between telemetry sensor 114 and well production system 100, a well assist system 128 may be constructed. Well assist system 128 may be implemented when wellbore 102 may be deviated and/or drilled for any length away from well production system 100 for fluid production. As illustrated, a conductive layer 140 may separate at least a part of wellbore 102 from operations at well production system 100. The well assist system 128 may be drilled below the conductive layer 140. Before well assist system 128 may be constructed, the optimum position relative to well production system 100 and the telemetry sensor 114 may be determined. Designating the correct site may be based on a number of factors, including, but not limited to, predicted electrical field distribution from the telemetry sensor. As illustrated in FIG. 2, well assist system 128 may be constructed to bypass conductive layer 140. Well assist system 128 may be drilled into the strong signal region of electromagnetic field 200 below conductive layer 140. Referring to FIG. 1, downhole tool 130 may be lowered by conveyance line 136. Downhole tool 130 may comprise sensor 144, referring to FIG. 1, which like production receiver 142, referring to FIG. 1, may be able to sense, measure, and record information from electromagnetic field 200, referring to FIG. 2. Sensor 144 may allow sensor, measure, and record information from below conductive layer 140. Sensor 144 may be described as an electronic dipole sensor, magnetometer; however, other suitable electromagnetic sensors may also be used. Sensor 144 may be disposed within an area where electromagnetic field 200 may be strong, as illustrated in FIG. 2. A strong electromagnetic field 200 detected by sensor 144 may contain large amounts of information encoded within the electromagnetic field 200, as electromagnetic field has not attenuated to the point that the information may have been corrupted with the attenuation of electromagnetic field 200.

FIGS. 3a and 3b illustrate sensor 144. Referring to FIG. 3a, sensor 144 may attach to conveyance line 136. Conveyance line 136 may comprise communication link 118 (e.g., communications lines), which may connect second information handling system 116b, referring to FIG. 1, to sensor 144. Referring to FIGS. 3a and 3b, sensor 144 may comprise a substrate 300 which may house a dipole antenna 302 which may sense electromagnetic field 200, referring to FIG. 2. Electromagnetic field 200 may induce a current in dipole antenna 302, which may traverse along transmission line 304 to communication link 118. In examples, it may be difficult to lower conveyance line 136 down a deep wellbore 102, referring to FIG. 1.

Figure 4B:
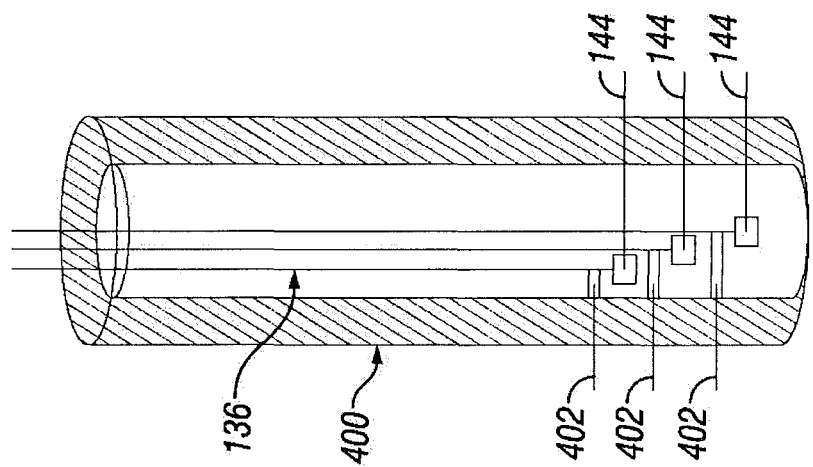
FIG. 4*b* is another schematic illustration of one or more sensors disposed in a casing.
Figure 4A:
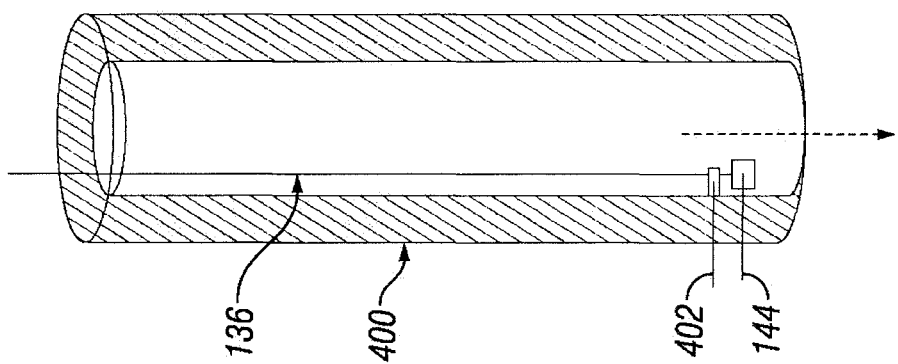
FIG. 4*a* is a schematic illustration of a sensor disposed in a casing.
Figure 5:
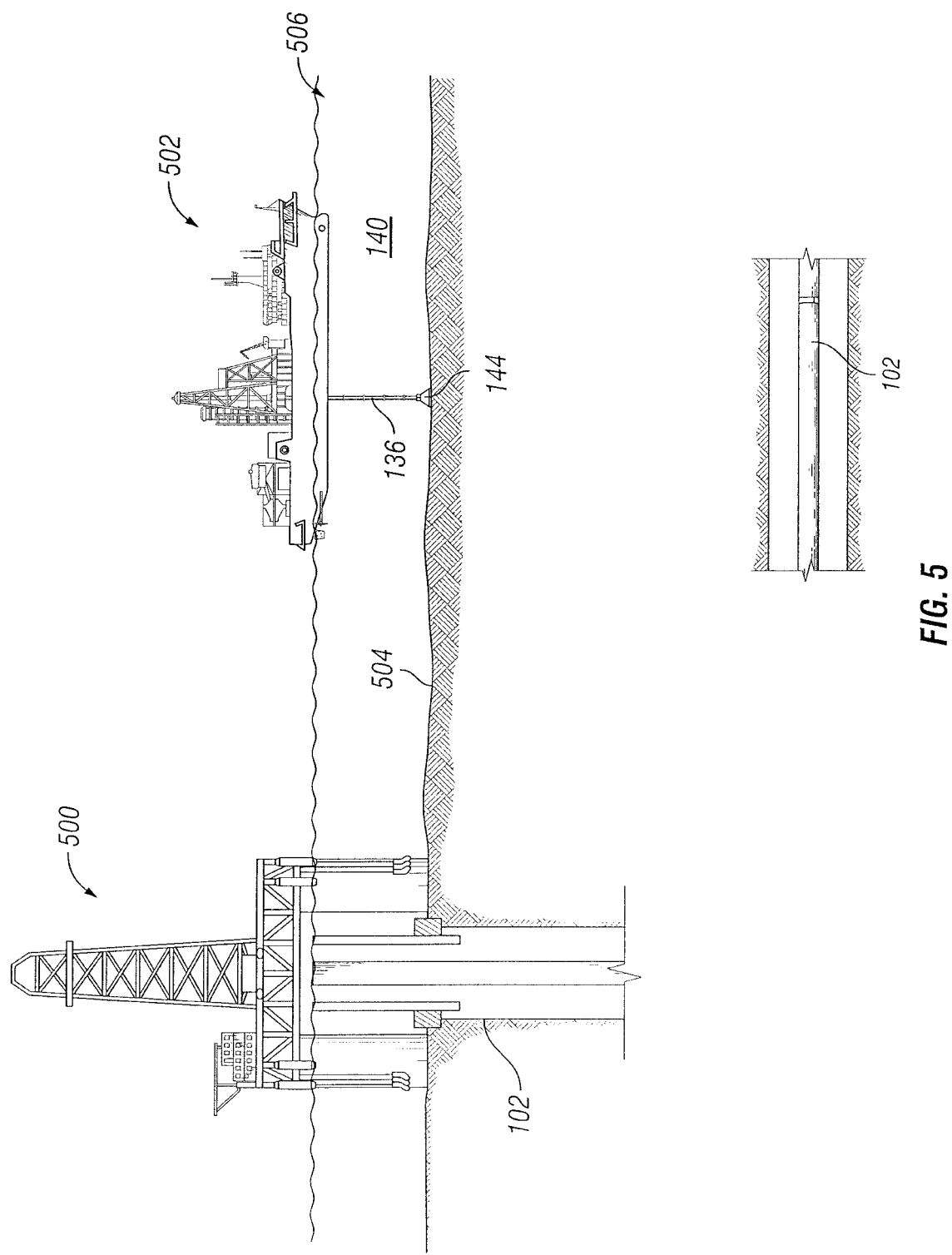
FIG. 5 is a schematic illustration of an offshore drilling system and an assist ship.

FIGS. 4a and 4b illustrate an example in which conveyance line 136 may be lowered down wellbore 102 of well assist system 128 with casing 400. In examples, conveyance line 136 may be attached to one end of casing 400 by a clamp 402 which may be soldered, or otherwise attached, to casing 400. Conveyance line 136 may be clipped and/or winded to clamp 402 and may be lowered down when casing 400 may be disposed down wellbore 102 of well assist system 128, referring to FIG. 1. FIG. 4b illustrates an example in which there may be more than one sensor 144 attached to more than one clamp 402 in casing 400. Information received from sensor 144 may be transmitted uphole through well assist system 128, referring to FIG. 1, and transmitted from well assist system 128 to well production system 100 in real time. This may allow an operator at well production system 100 to alter, correct, and/or change fluid movement in wellbore 102. This method may be implemented on land rigs and/or offshore rigs FIG. 5 illustrates an offshore drilling system 500 in which a telemetry sensor may be disposed in a wellbore 102. As illustrated, highly conductive layer 140, which may be a body of water, may prevent an electromagnetic field 200, referring to FIG. 2, from reaching offshore drilling system 500, which may comprise a production receiver 142, referring to FIG. 1. Highly conductive layer 140 may be defined as a formation layer with resistivity less than 1 Ohm-m. An assist ship 502, may act as well assist system 128, referring to FIG. 1, and detect an electromagnetic field. Sensor 144, may be lowered from assist ship 502 by conveyance line 136. In examples, sensor 144 may come in contact with water bottom 504, but does not necessarily need to be placed on the water bottom 504. Weights, not illustrated, may keep sensor 144 stationary during operations, which may prevent water currents from moving sensor 144 along water bottom 504, which may skew data.

Figure 6B:
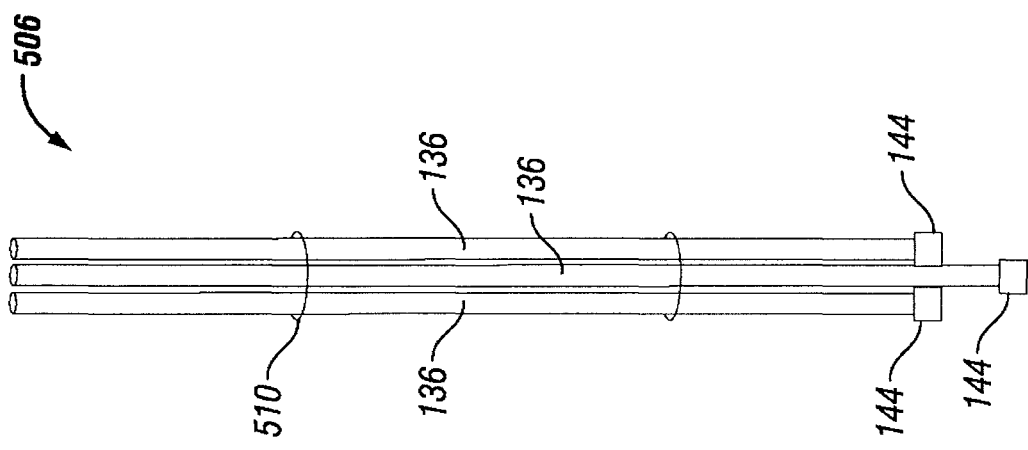
FIG. 6*b* is a schematic illustration of one or more sensors attached to each other.
Figure 6A:
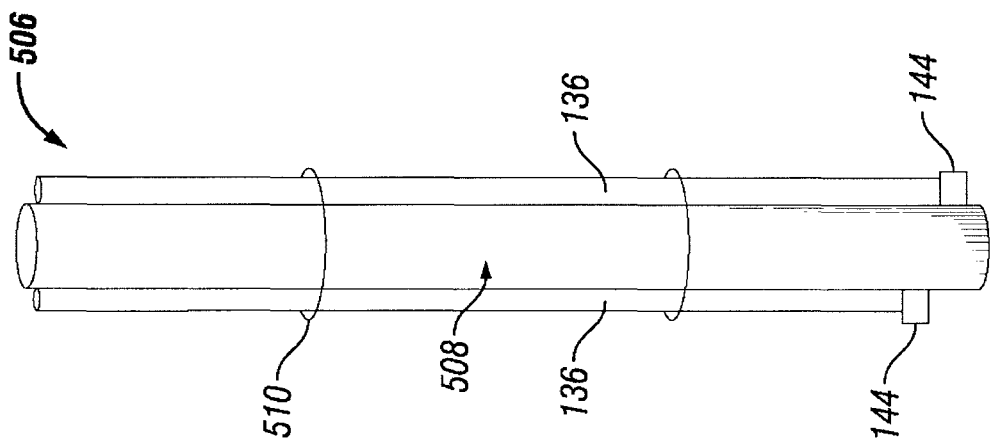
FIG. 6*a* is a schematic illustration of a sensor disposed on a structure.

FIGS. 6*a* and 6*b* illustrate sensor 144 that may be lowered within a body of water 506 to water bottom 504. Sensor 144 may comprise a structure 508, referring to FIG. 6*a*, in which conveyance line 136 and sensor 144 may be attached to through lashings 510. Structure 508 may be defined as an equipment fixture comprising weight which may position the sensor in water bottom 504. Structure 508 may stick into water bottom 504 and may hold one or more sensors 144 in place during operations. FIG. 6*b* one or more conveyance lines 136 and one or more sensors 144 may be held together by lashings 510. In this example, one or more sensor 144 may be disposed on water bottom 504. For offshore drilling, conductive layer 140 may be the top layers such as sea bed and reservoirs. Assist ship 502 may drop one or more sensors 144 to function similar to well assist system 152 for telemetry purpose. A dipole antenna 302, referring to FIG. 3*a*, and/or magnetometer may be connected to the end of conveyance line 136 or structure 508 and rest on water bottom 504 to sense electromagnetic field 200 before it may be attenuated by a conductive body of water. The received signal may then be transmitted back to assist ship 502 and then may be transmitted to offshore drilling system 500 by any suitable means.

Figure 7:
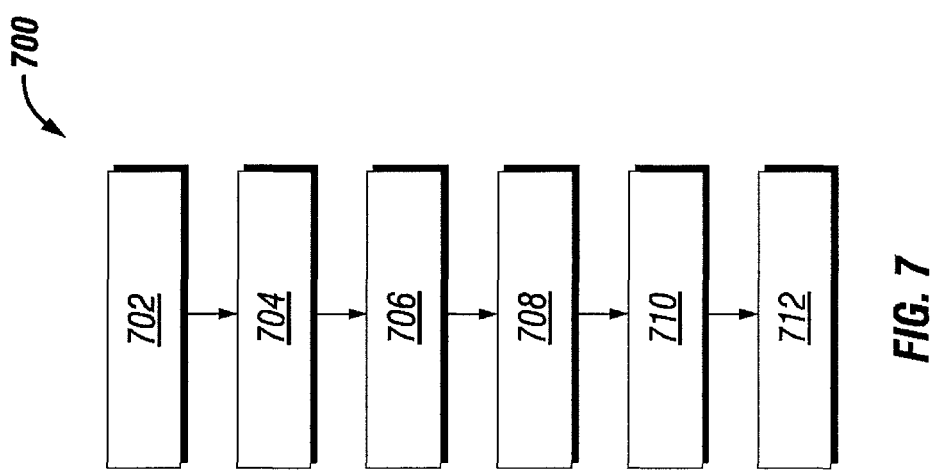
FIG. 7 is a method for production control with a well assist system and/or an assist ship.

FIG. 7 illustrates a workflow of method 700 for production control with well assist system 128, such as assist well and/or assist ship 502. In block 702, information from formations below surface 108, referring to FIG. 1, may be obtained from testing, proprietary knowledge, known libraries on formation characteristics, and/or the like. The information from block 702 may be input into a simulation, block 704, which may help in determining the location of well production system 100, well assist system 128, and/or assist ship 502. In block 706, the location of well assist system 128 and/or assist ship 502 may be optimized by determining the location in which sensor 144 may be deployed to sense, measure, and/or record electromagnetic field 200 transmitted by transmitter 113. Once determined, well assist system 152 and/or assist ship 502 may be drilled and/or deployed in block 708. In block 710, sensor 144 may be disposed within well assist system 152 and/or water bottom 504, referring to FIG. 5, where sensor 144 may begin to sense, measure, and/or record electromagnetic field 200 from transmitter 113. In block 712, information recorded by sensor 144 may be transmitted to well production system 100, which may contain information regarding fluid flow rate, temperature, pressure, resistivity, and/or the like.

This systems and methods may include any of the various features of the compositions, methods, and system disclosed herein, including one or more of the following statements.

Statement 1: A telemetry and communication system comprising: a well production system comprising: a telemetry sensor disposed in a production well below a highly conductive layer, wherein the highly conductive layer is characterized by a resistivity lower than 1 Ohm-m; a transmitter, wherein the transmitter is disposed with the telemetry sensor and broadcast information recorded by the telemetry sensor through a formation; and a well assist system comprising a sensor which is operable to receive information from the transmitter.

Statement 2: The telemetry and communication system of statement 1, wherein the well assist system comprises an assist wellbore, wherein the sensor is deployed into the assist wellbore below the highly conductive layer.

Statement 3: The telemetry and communication system of statement 2 or statement 1, wherein the well assist system comprises an information handling system that receives the information from the sensor.

Statement 4: The telemetry and communication system of any preceding statement, wherein the sensor of the well assist system is connected to a casing and wherein the casing is disposed within the assist wellbore.

Statement 5: The telemetry and communication system of any preceding statement, wherein the well assist system comprises an assist ship which is operable to deploy the sensor to a water bottom.

Statement 6: The telemetry and communication system of any preceding statement, wherein the well assist system comprises an information handling system disposed within the assist ship for receiving the information from the sensor.

Statement 7: The telemetry and communication system of any preceding statement, wherein the sensor is connected to a structure and wherein the structure is disposed on the water bottom by a conveyance line.

Statement 8: The telemetry and communication system of any preceding statement, wherein the sensor comprises a plurality of sensors connected together and wherein the sensors are disposed on the water bottom by a the conveyance line.

Statement 9: The telemetry and communication system of any preceding statement, wherein the sensor comprises a substrate, a dipole antenna, and a transmission line.

Statement 10: The telemetry and communication system of any preceding statement, wherein the sensor is suspended in an assist well or a body of water by a conveyance line.

Statement 11: A method for providing telemetry and communication comprising: determining a location of a well assist system for a well production system; deploying the well assist system to the location; disposing a sensor from the well assist system below a highly conductive layer, wherein the highly conductive layer is characterized by a resistivity lower than 1 Ohm-m; and receiving information with the sensor, the information being transmitted from a transmitter of the well production system disposed below the highly conductive layer.

Statement 12: The method of statement 11, wherein the sensor is connected to a structure and wherein the structure is disposed from an assist ship on a water bottom.

Statement 13: The method of statement 12 or statement 11, wherein the sensor comprises a plurality of sensors connected together, and wherein the sensors are disposed on a water bottom.

Statement 14: The method of any of statements 11-13, wherein the sensor comprises a substrate, a dipole antenna, and a transmission line.

Statement 15: The method of any of statements 11-14, wherein the sensor is coupled to a downhole tool deployed in an assist well by a conveyance line.

Statement 16: The method of any of statements 11-15, further comprising transmitting information from the sensor to an information handling system located at a surface of an assist well or on an assist ship.

Statement 17: The method of any of statements 11-16, further comprising transmitting information from the information handling system to the well production system.

Statement 18: The method of any of statements 11-17, further comprising altering flow of a fluid in a deviated well of the well production system based on the received information.

Statement 19: The method of any of statements 11-18, wherein the information comprises a wellbore parameter or information relating to a downhole reservoir.

Statement 20: The method of any of statements 11-19, wherein the wellbore parameter further comprises fluid flow rate, temperature, pressure, or resistivity.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A telemetry and communication system comprising:
    a well production system comprising:
        a telemetry sensor attached to a casing in a production well below a highly conductive layer of a formation, the casing encased by cement between the casing and the formation, wherein the highly conductive layer is characterized by a resistivity lower than 1 Ohm-m;
        a transmitter, wherein the transmitter is disposed with the telemetry sensor and broadcast information recorded by the telemetry sensor through a formation during production; and
    a well assist system comprising a sensor which is operable to receive information from the transmitter during the production.

2. The telemetry and communication system of claim 1, wherein the well assist system comprises an assist wellbore, wherein the sensor is deployed into the assist wellbore below the highly conductive layer.

3. The telemetry and communication system of claim 2, wherein the well assist system comprises an information handling system that receives the information from the sensor.

4. The telemetry and communication system of claim 2, wherein the sensor of the well assist system is connected to a casing and wherein the casing is disposed within the assist wellbore.

5. The telemetry and communication system of claim 1, wherein the well assist system comprises an assist ship which is operable to deploy the sensor to a water bottom.

6. The telemetry and communication system of claim 5, wherein the well assist system comprises an information handling system disposed within the assist ship for receiving the information from the sensor.

7. The telemetry and communication system of claim 5, wherein the sensor is connected to a structure and wherein the structure is disposed on the water bottom by a conveyance line.

8. The telemetry and communication system of claim 5, wherein the sensor comprises a plurality of sensors connected together and wherein the sensors are disposed on the water bottom by a conveyance line.

9. The telemetry and communication system of claim 1, wherein the sensor comprises a substrate, a dipole antenna, and a transmission line.

10. The telemetry and communication system of claim 1, wherein the sensor is suspended in an assist well or a body of water by a conveyance line.

11. A method for providing telemetry and communication comprising:
    performing a well-planning simulation to help in determining a location of a well assist system for a well production system;
    deploying the well assist system to the location determined from the well-planning simulation;
    disposing a sensor from the well assist system below a highly conductive layer of a formation, wherein the highly conductive layer is characterized by a resistivity lower than 1 Ohm-m; and
    receiving information with the sensor during production, the information being transmitted during the production from a transmitter disposed on a casing in the well production system disposed below the highly conductive layer, the casing encased by cement between the casing and the formation.

12. The method of claim 11, wherein the sensor is connected to a structure and wherein the structure is disposed from an assist ship on a water bottom.

13. The method of claim 12, wherein the sensor comprises a plurality of sensors connected together, and wherein the sensors are disposed on a water bottom.

14. The method of claim 11, wherein the sensor comprises a substrate, a dipole antenna, and a transmission line.

15. The method of claim 11, wherein the sensor is coupled to a downhole tool deployed in an assist well by a conveyance line.

16. The method of claim 11, further comprising transmitting information from the sensor to an information handling system located at a surface of an assist well or on an assist ship.

17. The method of claim 16, further comprising transmitting information from the information handling system to the well production system.

18. The method of claim 17, further comprising altering flow of a fluid in a deviated well of the well production system based on the received information.

19. The method of claim 11, wherein the information comprises a wellbore parameter or information relating to a downhole reservoir.

20. The method of claim 19, wherein the wellbore parameter further comprises fluid flow rate, temperature, pressure, or resistivity.

21. The method of claim 11, wherein performing the well-planning simulation further comprises inputting information obtained from testing, proprietary knowledge, or known libraries on formation characteristics to the simulation to help in determining the location of the well assist system for the well production system.

22. The method of claim 11, further comprising:
using a fixed location of the transmitter disposed on the casing as part of performing the well-planning simulation to help in determining the location of a well assist system for a well production system.

* * * * *